(12) United States Patent
Xu et al.

(10) Patent No.: US 12,407,151 B2
(45) Date of Patent: Sep. 2, 2025

(54) GROUNDING STRUCTURE, METHOD FOR ASSEMBLING GROUNDING STRUCTURE AND GAS-INSULATED TRANSMISSION LINE

(71) Applicant: Hitachi Energy Ltd, Zürich (CH)

(72) Inventors: Xiuming Xu, Fujian (CN); Dajin Chen, Fujian (CN); Tiansong Chen, Fujian (CN); Luopeng Liu, Fujian (CN); Jieshen Nong, Fujian (CN); Longguang Chen, Fujian (CN)

(73) Assignee: Hitachi Energy Ltd, Zürich (CH)

( * ) Notice: Subject to any disclaimer, the term of this patent is extended or adjusted under 35 U.S.C. 154(b) by 315 days.

(21) Appl. No.: 18/018,046

(22) PCT Filed: Aug. 3, 2020

(86) PCT No.: PCT/CN2020/106589
§ 371 (c)(1),
(2) Date: Jan. 26, 2023

(87) PCT Pub. No.: WO2022/027182
PCT Pub. Date: Feb. 10, 2022

(65) Prior Publication Data
US 2023/0261447 A1    Aug. 17, 2023

(51) Int. Cl.
*H02B 13/075* (2006.01)
*H01B 17/06* (2006.01)
*H04B 3/02* (2006.01)

(52) U.S. Cl.
CPC ........... *H02B 13/075* (2013.01); *H01B 17/06* (2013.01); *H04B 3/02* (2013.01)

(58) Field of Classification Search
None
See application file for complete search history.

(56) References Cited

U.S. PATENT DOCUMENTS 4,084,064 A    4/1978  Bowman

FOREIGN PATENT DOCUMENTS

| CN | 2883044 Y | 3/2007 |
| CN | 201975178 U | 9/2011 |

(Continued)

OTHER PUBLICATIONS

CN 109686513 B Translation (Year: 2025).*

(Continued)

*Primary Examiner* — Timothy J Thompson
*Assistant Examiner* — John B Freal
(74) *Attorney, Agent, or Firm* — Sage Patent Group (57) ABSTRACT

The present disclosure provides a grounding structure, a method for assembling the same and a gas-insulated transmission line. The grounding structure includes a grounding guide defining a guiding hole and a grounding support fixed on the grounding guide and defining a cavity for accommodating a grounding contact. The grounding contact is arranged in the cavity and protrudes through the guiding hole on the grounding guide. The grounding contact is moveable along the wall of the cavity by a grounding spring accommodated in the cavity to realize the adaptive adjustment of the installation position. The grounding structure can be pre-assembled in an accurate and efficient way to avoid the components therein damaging, thereby improving the reliability and safety of the grounding structure and the gas-insulated equipment in which the grounding structure is used.

18 Claims, 4 Drawing Sheets

(56) References Cited

FOREIGN PATENT DOCUMENTS

| | | | |
|---|---|---|---|
| CN | 203632160 U | 6/2014 | |
| CN | 205384910 U | 7/2016 | |
| CN | 106024222 A | 10/2016 | |
| CN | 208674596 U | 3/2019 | |
| CN | 107403670 B | 5/2019 | |
| CN | 210016001 U | 2/2020 | |
| CN | 109686513 B * | 7/2020 | ............ H01B 17/14 |
| JP | 2003175748 A | 6/2003 | |
| KR | 100692503 B1 | 3/2007 | |

OTHER PUBLICATIONS

International Search Report and Written Opinion of the International Searching Authority, PCT/CN2020/106589, mailed May 7, 2021, 11 pages.
Search Report, European Patent Application No. 20948279.3, mailed Mar. 5, 2024, 9 pages.
Chinese Office Action and English Translation, Chinese Application No. 202080104811.X, mailed Apr. 25, 2025, 10 pages.

\* cited by examiner

GROUNDING STRUCTURE, METHOD FOR ASSEMBLING GROUNDING STRUCTURE AND GAS-INSULATED TRANSMISSION LINE

CROSS REFERENCE TO RELATED APPLICATIONS

This application is a 35 U.S.C. § 371 national stage application of PCT International Application No. PCT/CN2020/106589 filed on Aug. 3, 2020, the disclosure and content of which is incorporated by reference herein in its entirety.

FIELD OF THE INVENTION

The present disclosure generally relates to a field of gas-insulated equipment/subsystem of gas-insulated system, and more particularly, relates to a grounding structure and a gas-insulated transmission line comprising the same. Also, the present disclosure relates to a method for assembling the grounding structure.

BACKGROUND OF THE INVENTION

With the continuous development of high voltage transmission, some gas-insulated equipment in the gas-insulated system, such as gas-insulated transmission line (GIL) or gas-insulated high-voltage switchgear (GIS), are playing increasingly important role. Regarding the gas-insulated high-voltage switchgear, it is compact metal encapsulated switchgear consisting of high-voltage components such as circuit-breakers and disconnectors, which can be safely operated in confined spaces. With respect to the gas-insulated transmission line, it typically comprises a hollow, cylindrical outer enclosure, an inner conductor arranged within the outer enclosure, and a compressed gas, such as sulfur hexafluoride or the like, in the enclosure to electrically insulate the conductor from the enclosure. An insulator is arranged in the enclosure and supports the conductor therein. The insulator contacts with the enclosure through a grounding structure, thus ensuring reliable grounding.

In conventional solutions, the grounding structure between the insulator and the enclosure was achieved by grounding contacts and grounding springs. For example, CN106024222B describes a grounding structure comprising grounding contacts, grounding springs and a floating portion for mounting the grounding contacts and the grounding springs. However, in such conventional solutions, the contact force of the grounding contacts may be unstable, since both ends of the grounding springs are connected to the grounding contacts and the insulator, and then the compression amount of the grounding springs may be affected by the processing accuracy of related parts such as the insulator and the enclosure. Further, there is a risk of twisting and inclining of the grounding springs when the grounding structure slides inside the enclosure. Moreover, the grounding contacts and the grounding springs may fall during assembly since the grounding contacts, the grounding springs and the floating portion are not pre-assembled.

SUMMARY OF THE INVENTION

In order to solve the above problems existing in the prior art, the present disclosure aims to provide an improved grounding structure, which can be assembled in a simple manner and ensure reliable grounding function.

In one aspect of the present disclosure, a grounding structure is provided. The grounding structure comprises a grounding guide defining a guiding hole and a grounding support fixed on the grounding guide and defining a cavity for accommodating a grounding contact. The grounding contact is arranged in the cavity and protrudes through the guiding hole on the grounding guide. The grounding contact is moveable along the wall of the cavity by a grounding spring accommodated in the cavity to realize the adaptive adjustment of the installation position.

With the solution of the present disclosure, the grounding support and the grounding guide can be pre-assembled as a subassembly, which makes assembly easier. The grounding spring and the grounding contact are arranged in the cavity of the grounding support to make sure that the compression amount of the grounding spring is only affected by the dimensional accuracy of the subassembly, which can ensure reliable contacting effect. In addition, due to the grounding support and the grounding guide being fixed together, the subassembly will be rotated synchronously when the grounding guide is rotated, so as to avoid twisting and inclining of the grounding spring.

In accordance with the foregoing technical concept, the present disclosure may further include any one or more of the following alternative embodiments.

In some alternative embodiments, the grounding guide is configured as a cylinder having an open end for receiving the grounding support therein and a contacting end having the guiding hole. The grounding guide is moveable via a supporting spring engaged with inner surface of the contacting end and arranged in series with the grounding spring.

In this way, when the grounding structure is applied to a gas-insulated equipment, such as a gas-insulated transmission line, since the supporting spring is arranged in series with the grounding spring and engaged with the grounding guide (and then the subassembly), the supporting spring can guarantee reliable contact between the subassembly and the inner surface of enclosure of the gas-insulated transmission line.

In some alternative embodiments, the grounding support is fixed on the inner surface of the contacting end of the grounding guide via fastener.

In some alternative embodiments, the grounding guide is provided with a spacer ring sleeved on the fastener.

In some alternative embodiments, the grounding support is provided with two cavities arranged symmetrically along a central axis of the grounding guide, and the grounding guide is provided with two guiding holes on the contacting end. Each of the guiding holes comprises an annular rib extending radially inward from the edge thereof for limiting the grounding contact.

In some alternative embodiments, the grounding guide is provided with a slot on the outer surface of the contacting end for collecting metal particles, and the guiding hole is arranged in the slot.

In some alternative embodiments, the grounding guide is provided with an aperture on the wall of the cylinder for releasing gas in the grounding structure.

In some alternative embodiments, the grounding support is provided with an annular flange extending parallel to the inner surface of the contacting end, and the supporting spring is configured to engage with the annular flange.

In some alternative embodiments, the grounding support is provided with a hole on the wall of the cavity for releasing gas in the grounding structure.

In some alternative embodiments, the grounding structure is assembled in gas-insulated system.

In some alternative embodiments, the grounding structure is operable to convert electric floating potential of gas-insulated system in which the grounding structure is used into electric ground potential.

In accordance with another aspect of the present disclosure, a gas-insulated transmission line is provided. The gas-insulated transmission line comprises an outer enclosure, an insulator arranged in the outer enclosure and a grounding structure according to the above-mentioned aspect. The grounding structure is pre-assembled before being mounted on the insulator by fixing the grounding support on the grounding guide and the grounding guide is adapted to move in a radial direction of the gas-insulated transmission line for contacting the outer enclosure.

In some alternative embodiments, the grounding guide is moveable via a supporting spring arranged in series with the grounding spring in the grounding support and engaged between the grounding guide and the insulator.

In accordance with another aspect of the present disclosure, a method for assembling a grounding structure is provided. The method comprises steps of providing a grounding guide having a guiding hole; providing a grounding support having a cavity; providing a grounding contact and a grounding spring; positioning the grounding contact and the grounding spring in the cavity to realize the adaptive adjustment of the installation position of the grounding contact by the grounding spring; and fixing the grounding support on the grounding guide to form a pre-assembled subassembly with the grounding contact protruding through the guiding hole.

In some alternative embodiments, the pre-assembled subassembly is adapted to be arranged on an insulator of a gas insulated transmission line with a supporting spring engaged between the insulator and the grounding guide and arranged in series with the grounding spring in the grounding support.

According to the present disclosure, the grounding structure can be pre-assembled in an accurate and efficient way to avoid the components therein damaging, thereby improving the reliability and safety of the grounding structure and the gas-insulated equipment in which the grounding structure is used.

These and other aspects and advantages of the present disclosure will be apparent from and elucidated with reference to the embodiments described hereinafter.

BRIEF DESCRIPTION OF THE DRAWINGS

For the purpose of understanding the present disclosure, the present disclosure will be explained in detail by embodiments with reference to the accompanying drawings in the following in which similar reference numerals designate the same or similar components and wherein.

DETAILED DESCRIPTION OF EMBODIMENTS

Although the present disclosure may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described hereinafter. Therefore, unless otherwise noted, features disclosed herein may be combined together to form additional combinations that were not otherwise shown for purposes of brevity.

When describing the structural positions of various components, such as the directions of upper, lower, top, bottom, etc., the description is not absolute, but relative. When the various components are arranged as shown in the figures, these directional expressions are appropriate, but when the positions of the various components in the figures would be changed, these directional expressions would also be changed accordingly.

In the present disclosure, the term "inner" refers to the direction toward the inside of the gas-insulated equipment, and the term "outer" refers to the direction toward the outside of the gas-insulated equipment.

As mentioned above, if the conventional grounding structure is applied to the gas-insulated transmission line, there are many problems in the grounding structure between the insulator and the enclosure of the gas-insulated transmission line, and the present disclosure aims to provide an improved grounding structure. Some exemplary embodiments of the grounding structure and the gas-insulated transmission line comprising the same are now described with reference to FIGS. 1 to 6. It should be understood that the grounding structure of the present disclosure can be assembled in gas-insulated system, and used in any gas-insulated equipment/subsystems other than the gas-insulated transmission line. Although the gas-insulated transmission line is described herein, the grounding structure of the present disclosure can also be used for gas-insulated high-voltage switchgear and so on.

Figure 1:
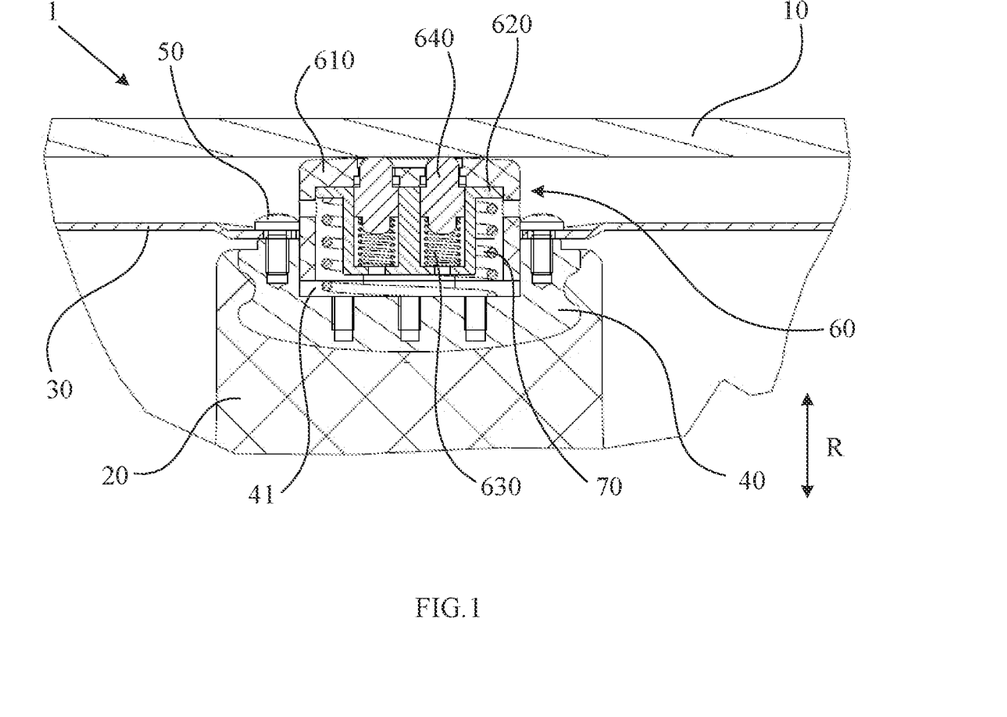
FIG. 1 is a schematic sectional view of a grounding structure according to an embodiment of the present disclosure which is applied to a gas-insulated transmission line.

As shown in FIG. 1, in general, the gas-insulated transmission line 1 comprises an elongated, cylindrical outer enclosure 10 and an elongated conductor (not shown) arranged therein. An insulator 20 is arranged in the outer enclosure 10 and supports the conductor. The insulator 20 comprises at least one supporting leg extended in a radial direction R and is usually composed of epoxy resin casting parts and metallic insert 40 arranged on the end of the supporting leg. A particle trap 30 is fixed on the metallic insert 40 by fasteners 50 and can be electrically connected with the outer enclosure 10 via a grounding structure 60, so as to form a metal particle trap with equal potential with the outer enclosure 10 to collect foreign matters such as metal scraps in the outer enclosure 10. It should be understood that, without the grounding structure 60, some components in the outer enclosure 10 would be at electric floating potential, and the grounding structure 60 is operable to convert the electric floating potential into electric ground potential to ensure the normal use of the gas-insulated equipment and personal and property safety.

According to the present disclosure, the grounding structure 60 is provided between the outer enclosure 10 and the insulator 20 (more particularly, the metallic insert 40 of the insulator 20). Referring to FIGS. 1 to 6, the grounding structure 60 comprise a grounding guide 610 defining a guiding hole 617 and a grounding support 620 fixed on the grounding guide 610 and defining a cavity 622 for accommodating a grounding contact 640. The grounding contact 640 is arranged in the cavity 622 and protruding through the guiding hole 617 on the grounding guide 610. In this way, when the grounding structure 60 is applied in the gas-insulated transmission line 1 as shown in FIG. 1, the grounding contact 640 can be moveable along the wall of the cavity 622 by a grounding spring 630 accommodated in the cavity 622 to realize the adaptive adjustment of the installation position, so that the grounding contact 640 can keep in contact with the inner surface of the outer enclosure 10.

Figure 2:
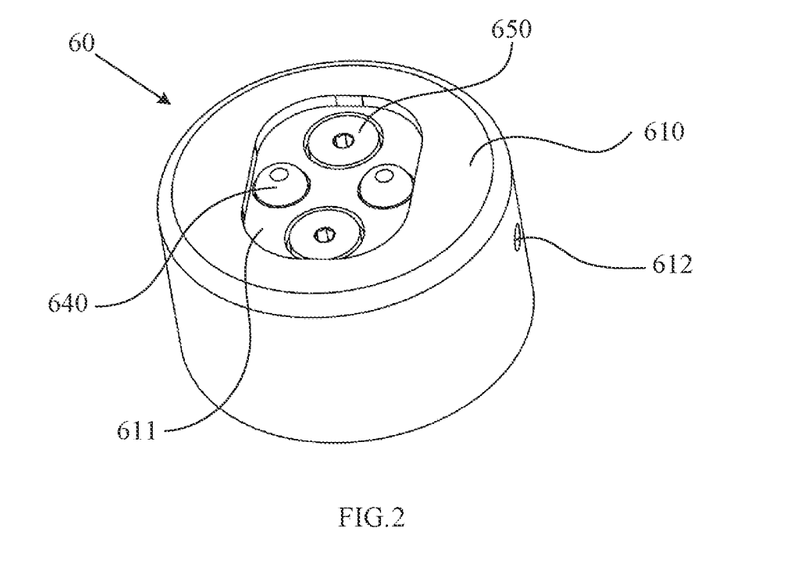
FIG. 2 is a schematic perspective view of the grounding structure according to an embodiment of the present disclosure.
Figure 4:
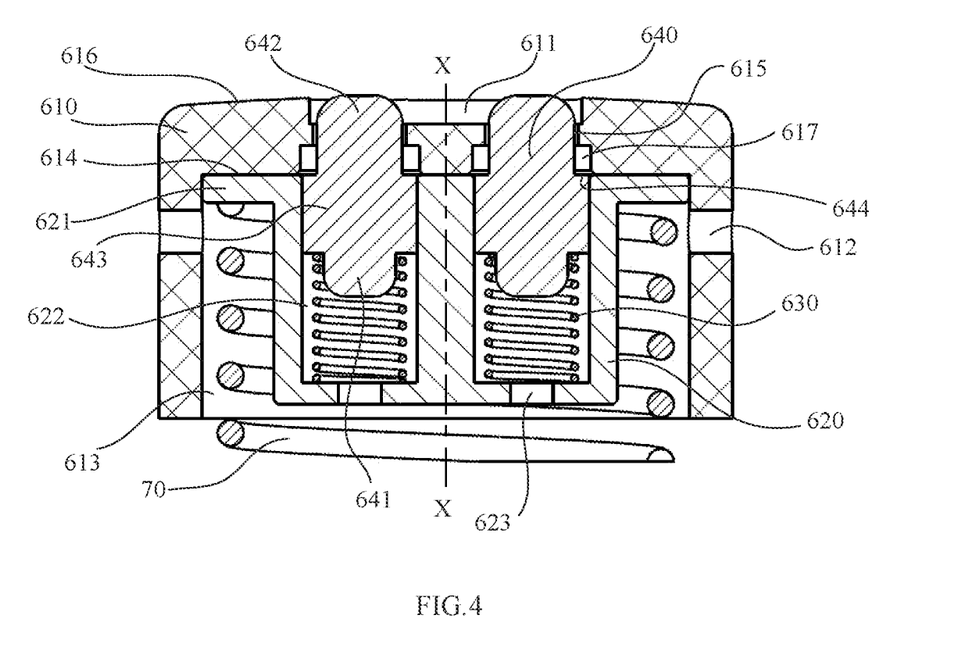
FIG. 4 is a schematic sectional view of the grounding structure taken along the A-A line in FIG. 3.
Figure 5:
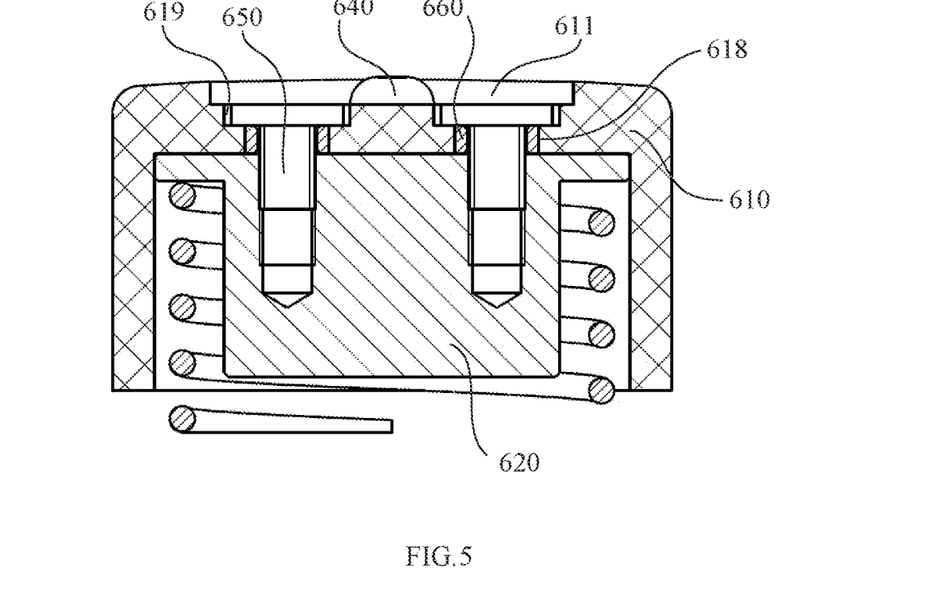
FIG. 5 is a schematic sectional view of the grounding structure taken along the B-B line in FIG. 3.
Figure 6:
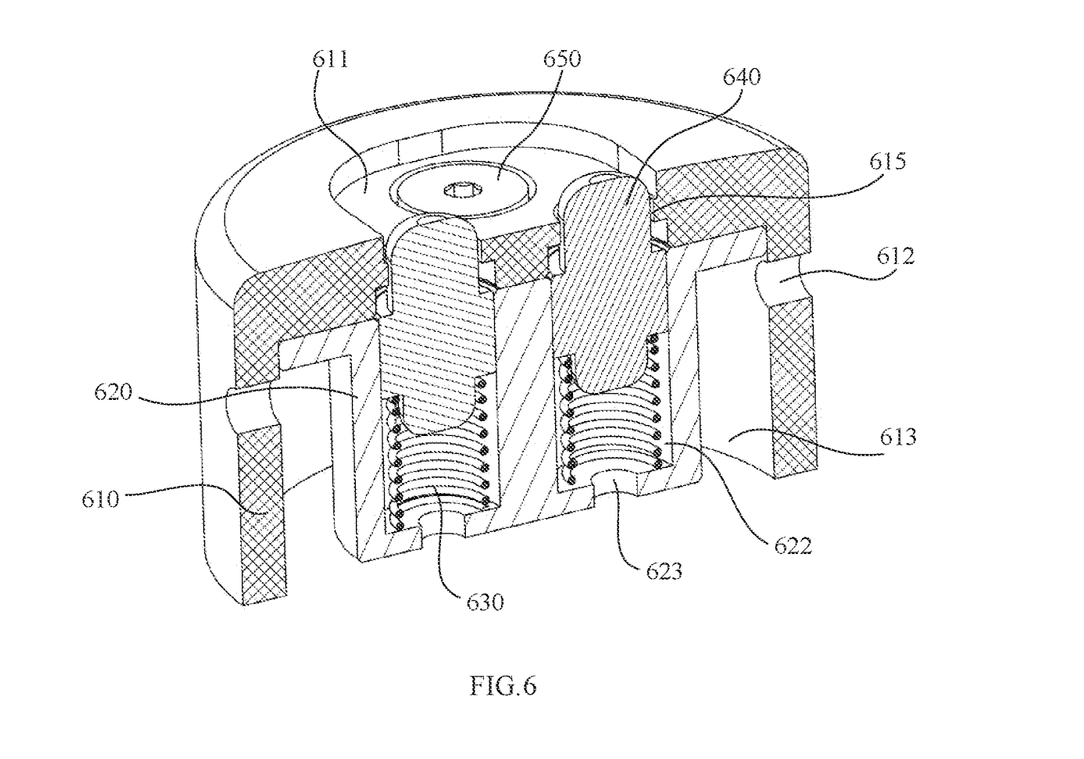
FIG. 6 is a schematic perspective view illustrating the grounding structure taken along the A-A line in FIG. 3, and the supporting spring is removed.

In some embodiments, the grounding guide 610 is configured as a cylinder having an open end 613 for receiving the grounding support 620 therein and a contacting end having the guiding hole 617, as shown in FIGS. 2 and 4. The grounding support 620 is fixed on the inner surface 614 of the contacting end of the grounding guide 610 via fastener 650, such as screws, bolts or the like. As best shown in FIG. 5, the grounding guide 610 is also provided with one or more mounting holes 618 for receiving one or more fasteners 650. As an example, two mounting holes 618 for two fasteners 650 are shown. It should be appreciated that the number and arrangement of the mounting hole(s) 618 shown in the embodiments are only exemplary and not intended for limiting the scope of the present disclosure. In some embodiments, there can be any suitable number of the mounting hole(s) 618.

In some embodiments, if considering the strength of joint position, a spacer ring can be further provided. For example, a spacer ring 660 can be sleeved on the fastener 650 to prevent the grounding guide 610 usually made of insulating material, such as plastic, from being worn or damaged. Preferably, the spacer ring 660 is made of metal or the like.

In this way, the grounding guide 610 and the grounding support 620 can be pre-assembled as a subassembly, which is easily assembled or disassembled as required. Due to the grounding guide 610, the grounding support 620 as well as the grounding contact 640 and the grounding spring 630 in the grounding support 620 are pre-assembled as a whole, to avoid risk of accidental falling to any component in such subassembly. In particular, when the grounding guide 610 is rotated during operation of the gas-insulated transmission line 1, the subassembly will rotate synchronously. Since the grounding spring 630 is arranged in the cavity 622 of the grounding support 620, the compression amount of the grounding spring 630 is only affected by the dimensional accuracy of the components of the subassembly but not the insulator 20 and/or the outer enclosure 10. Therefore, the twisting and inclining of the grounding spring 630 can be reduced or eliminated.

Figure 3:
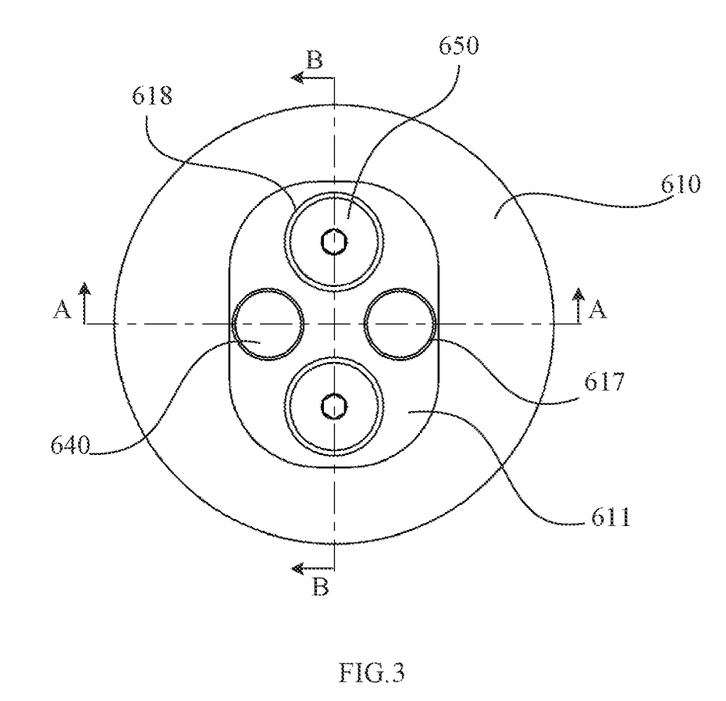
FIG. 3 is a schematic plan view of the grounding structure shown in FIG. 2.

In some embodiments, as shown in FIGS. 2 to 4, the grounding support 620 is provided with two cavities 622 arranged symmetrically along a central axis X of the grounding guide 610, and the grounding guide 610 is provided with two guiding holes 617 for limiting the corresponding grounding contact 640. Thus, two grounding contacts 640 and two grounding springs 630 are respectively arranged in the corresponding cavities 622 to increase the grounding surface so as to improve the grounding effect. It should be appreciated that the number and arrangement of the guiding hole(s) 617 shown in the embodiments are only exemplary and not intended for limiting the scope of the present disclosure. In some embodiments, there can be any suitable number of the guiding hole(s) 617.

In some embodiments, as can be seen from FIG. 4, the grounding contact 640 can be configured to have two ends with reduced size. That is, one end 641 is inserted into the grounding spring 630 to be moved with the action of grounding spring 630, the other end 642 can protrude through the grounding hole 617, and the central portion 643 between the ends 641, 642 has relatively larger size and can move along the wall of the cavity 622. In some embodiments, each of the guiding holes 617 comprises an annular rib 615 extending radially inward from the edge thereof for limiting the grounding contact 640. Specifically, the annular rib 615 can abut against a step surface 644 between the end 642 and the central portion 643, and thus the grounding contact 640 cannot protrude through the guiding hole 617 freely.

It can be noted that, in some embodiments, the grounding hole(s) 617 and the mounting hole(s) 618 are preferably arranged symmetrically along a central axis X of the grounding guide 610 and arranged in a staggered manner with each other, as shown in FIG. 3. In addition, the fastener(s) 650 shall be configured not to interfere with the action of grounding contact(s) 630, and thus a counter hole 619 is provided at the mounting hole 618 to avoid protrusion of the fastener 650 and ensure the smoothness of the installation plane, as shown in FIG. 5. For the sake of brevity, only one grounding hole 617 and the corresponding grounding contact 640 as well as the grounding spring 630 in the corresponding cavity 622 will be described hereinafter.

Referring to FIGS. 2 and 4, it can be seen that a supporting spring 70 is provided to make the grounding guide 610 to be moveable along the radial direction R to contact the inner surface of the outer enclosure 10. In some embodiments, the supporting spring 70 is arranged in the grounding guide 610 from the open end 613 and can engage with the inner surface 614 of the contacting end of the grounding guide 610. In some embodiments, the grounding support 620 is provided with an annular flange 621 extending parallel to the inner surface 614 of the contacting end, as shown in FIG. 4, and the supporting spring 70 can be configured to engage with the annular flange 621.

In any embodiments, regardless of the structure of the grounding guide 610 and/or the grounding support 620, the supporting spring 70 is preferably configured to be in series with the grounding spring 630. That is to say, there is interaction between the supporting spring 70 and the grounding spring 630, the movement of the supporting spring 70 will force the grounding spring 630 to move, and then guaranteeing reliable contact between the ground contact 640 and the inner surface of the outer enclosure 10. Moreover, a single supporting spring 70 can be used to further avoid the twisting and inclining of the support spring 630.

In some embodiments, as can be seen from FIG. 1, the outer surface of the grounding guide 610 can completely fit the inner surface of the outer enclosure 10 under the interaction of the supporting spring 70 and the grounding spring 630. The reason is that the contacting end of the grounding guide 610 can be configured with a spherical outer surface 616 having a radius same as the inner radius of the outer enclosure 10, which can reduce sliding resistance and avoid scraps caused by friction. In this way, when the grounding structure 60 is assembled in the outer enclosure 10, the grounding structure 60 can slide stably inside the outer enclosure 10 to make sure that the grounding contact 640 reliably contacts the inner surface of the outer enclosure 10.

In some embodiments, as can be seen from FIG. 2, there is a slot 611 on the outer surface 616 of the grounding guide 610 to collect the metal particles generated between the grounding contact 640 and the inner surface of the outer enclosure 10. It is beneficial that the guiding hole 617 and the mounting hole 618 are arranged in the slot 611. In this way, the metal scraps possibly produced by the action of the grounding contact 640 can also be well collected in the slot 611, so as to avoid adverse effects in the gas-insulated transmission line 1.

Back to FIG. 4, in some embodiments, the grounding guide 610 is provided with an aperture 612 on the wall of the cylinder. As an example, two apertures 612 are illustrated. It should be appreciated that the number and arrangement of the aperture(s) 612 shown in the embodiments are only exemplary and not intended for limiting the scope of the present disclosure. During the movement or operation of the grounding structure 60, the gas therein would increase the pressure impacted on the components, and thus the apertures 612 can be advantageously provided for releasing the gas in the grounding structure 60.

Similarly, the grounding support 620 is alternatively provided with a hole 623 on the wall of the cavity 622 for releasing the gas in the grounding structure 60. Also, two holes 612 are illustrated as an example. It should be appreciated that the number and arrangement of the hole(s) 623 shown in the embodiments are only exemplary and not intended for limiting the scope of the present disclosure. In some embodiments, the holes 623 can be arranged on the bottom wall of the cavity 622, as shown in FIG. 4. With such arrangement, the holes 623 can be functioned as positioning hole to help to pre-assemble the grounding structure 60, which can be more apparent from the description below.

Generally speaking, the grounding structure 60 of the present disclosure can be operable to effectively realize the reliable grounding function in the gas-insulated transmission line. Specifically, the grounding structure 60 can convert the electric floating potential of the components in the gas-insulated transmission line, such as the particle trap 30, the metal insert 40 and the fasteners 50, into the electric grounding potential, so as to realize equipotential between the outer enclosure 10 and the conductor of the gas-insulated transmission line.

Figure 7:
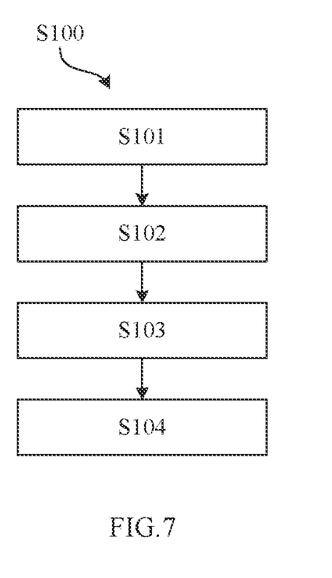
FIG. 7 is a schematic diagram illustrating the steps of a method for assembling the grounding structure according to an embodiment of the present disclosure.

FIG. 7 illustrates a method S100 in some embodiments for assembling the grounding structure 60 as described above.

At block S101, with reference to FIG. 4, the grounding guide 610, the grounding support 620, the grounding contact 640 and the grounding spring 630 are provided. In some embodiments, the grounding support 620 may be arranged that the opening of the cavity 622 thereof face upward. If the hole 623 is provided on the bottom wall of the cavity 622, the hole 623 can be used to position the grounding support 620 by putting the grounding support 620 on a tool and making a positioning portion on the tool into the hole 623.

At block S102, the grounding contact 640 and the grounding spring 630 can be positioned in the cavity 622 of the grounding support 620, so that the adaptive adjustment of the installation position of the grounding contact 640 can be realized by the grounding spring 630.

At block S103, with reference to FIG. 5, the grounding support 620 and the grounding guide 610 can be fixed together, for example, by the fastener 650 to form a pre-assembled subassembly. The grounding contact 640 can protrude through the guiding hole 617 of the grounding guide 610 so as to contact with the inner surface of the outer enclosure 10 when the grounding structure 60 is assembled in the gas insulated transmission line 1.

At block S104, in some embodiments, with reference to FIG. 1, the pre-assembled subassembly is adapted to be arranged on the insulator 20 of the gas insulated transmission line 1 with the supporting spring 70 engaged between the insulator 20 and the grounding guide 610.

It should be understood that the embodiments shown in the figures only illustrate the optional shapes, sizes and arrangements of various optional components of the grounding structure and the gas-insulated transmission line having the grounding structure according to the present disclosure; however, it is only for illustration and not limitation, and other shapes, sizes and arrangements may be adopted without departing from the spirit and scope of the present disclosure.

The specific embodiments disclosed herein are merely illustrative of the present disclosure. It would be apparent to those skilled in the art that various modifications could be made according to the teachings of the present disclosure and the present disclosure could be practiced in various equivalent ways. Thus, the particular embodiments of the present disclosure disclosed above are illustrative only, and the scope of protection of the present disclosure is not limited by the details of the structures or designs disclosed herein. Accordingly, various substitutions, combinations or modifications could be made to the particular exemplary embodiments disclosed above, and all variations thereof fall within the scope of the present disclosure.

The invention claimed is:

1. A grounding structure, comprising:
a grounding guide defining a guiding hole;
a grounding support fixed on the grounding guide and defining a cavity for accommodating a grounding contact;
wherein the grounding contact is arranged in the cavity and protruding through the guiding hole on the grounding guide; and the grounding contact is moveable along the wall of the cavity by a grounding spring accommodated in the cavity to realize the adaptive adjustment of the installation position, wherein the grounding guide is configured as a cylinder having an open end for receiving the grounding support therein and a contacting end having the guiding hole, and wherein the grounding guide is moveable via a supporting spring engaged with the inner surface of the contacting end and arranged in series with the grounding spring.

2. The grounding structure according to claim 1, wherein the grounding support is fixed on the inner surface of the contacting end of the grounding guide via fastener.

3. The grounding structure according to claim 2, wherein the grounding guide is provided with a spacer ring sleeved on the fastener.

4. The grounding structure according to claim 1, wherein the grounding support is provided with two cavities arranged symmetrically along a central axis of the grounding guide, and the grounding guide is provided with two guiding holes on the contacting end; and wherein each of the guiding holes comprises an annular rib extending radially inward from the edge thereof for limiting the grounding contact.

5. The grounding structure according to claim 1, wherein the grounding guide is provided with a slot on outer surface of the contacting end for collecting metal particles, and the guiding hole is arranged in the slot.

6. The grounding structure according to claim 1, wherein the grounding guide is provided with an aperture on the wall of the cylinder for releasing gas in the grounding structure.

7. The grounding structure according to claim 1, wherein the grounding support is provided with an annular flange extending parallel to the inner surface of the contacting end, and the supporting spring is configured to engage with the annular flange.

8. The grounding structure according to claim 1, wherein the grounding support is provided with a hole on the wall of the cavity for releasing gas in the grounding structure.

9. The grounding structure according to claim 1, wherein the grounding structure is assembled in a gas-insulated system.

10. The grounding structure according to claim 1, wherein the grounding structure is operable to convert electric floating potential of a gas-insulated system in which the grounding structure is used into electric ground potential.

11. A gas-insulated transmission line, comprising:
an outer enclosure;
an insulator arranged in the outer enclosure; and
a grounding structure according to claim 1;
wherein the grounding structure is pre-assembled before being mounted on the insulator by fixing the grounding support on the grounding guide, and the grounding guide is adapted to move in a radial direction of the gas-insulated transmission line for contacting the outer enclosure.

12. The gas-insulated transmission line according to claim 11, wherein the grounding guide is moveable via the supporting spring arranged in series with the grounding spring in the grounding support and engaged between the grounding guide and the insulator.

13. A method for assembling a grounding structure,:
providing a grounding guide having a guiding hole;
providing a grounding support having a cavity;
providing a grounding contact and a grounding spring;
positioning the grounding contact and the grounding spring in the cavity to realize the adaptive adjustment of the installation position of the grounding contact by the grounding spring; and
fixing the grounding support on the grounding guide to form a pre-assembled subassembly with the grounding contact protruding through the guiding hole, wherein the grounding guide is configured as a cylinder having an open end for receiving the grounding support therein and a contacting end having the guiding hole, and wherein the grounding guide is moveable via a supporting spring engaged with the inner surface of the contacting end and arranged in series with the grounding spring.

14. The method according to claim 13, wherein the pre-assembled subassembly is adapted to be arranged on an insulator of a gas insulated transmission line with the supporting spring engaged between the insulator and the grounding guide and arranged in series with the grounding spring in the grounding support.

15. The method of claim 13, wherein the grounding guide is moveable via the supporting spring arranged in series with the grounding spring in the grounding support and engaged between the grounding guide and an insulator.

16. The method of claim 13, wherein the grounding structure is operable to convert electric floating potential of a gas-insulated system in which the grounding structure is used into electric ground potential.

17. The method of claim 13, wherein the grounding guide is provided with an aperature on the wall of the cylinder for releasing gas in the grounding structure.

18. The method of claim 13, wherein the grounding guide is provided with a slot on an outer surface of the contacting end for collecting metal particles, and the guiding hole is arranged in the slot.

* * * * *